United States Patent
Wenger et al.

(10) Patent No.: US 7,715,978 B1
(45) Date of Patent: May 11, 2010

(54) METHOD OF POSITIONING PERSPECTIVE TERRAIN ON SVS PRIMARY FLIGHT DISPLAYS USING TERRAIN DATABASE AND RADIO ALTITUDE

(75) Inventors: Jason C. Wenger, North Liberty, IA (US); Sarah Barber, Robins, IA (US); Alex Postnikov, Cedar Rapids, IA (US); Andrew M. Pelzer, Atalissa, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 767 days.

(21) Appl. No.: 11/700,530

(22) Filed: Jan. 31, 2007

(51) Int. Cl.
*G01C 21/00* (2006.01)

(52) U.S. Cl. ............ 701/200; 701/4; 340/977; 342/65

(58) Field of Classification Search ........... None
See application file for complete search history.

(56) References Cited

U.S. PATENT DOCUMENTS 6,157,891 A * 12/2000 Lin ............ 701/301
6,512,976 B1 * 1/2003 Sabatino et al. ............ 701/207
2007/0171094 A1 * 7/2007 Alter et al. ............ 340/970
2007/0297696 A1 * 12/2007 Hamza et al. ............ 382/294

FOREIGN PATENT DOCUMENTS

WO   WO 2004/034373 A2 *   4/2004

* cited by examiner

*Primary Examiner*—Michael J. Zanelli
(74) *Attorney, Agent, or Firm*—Matthew J. Evans; Daniel M. Barbieri

(57) ABSTRACT

The present invention is directed to a method of positioning perspective terrain on a SVS (Synthetic Vision System) based on a navigation solution, the vertical component of which is calculated utilizing a terrain database and sensing unit (which provides height above terrain). The terrain database provides elevation of terrain above MSL. A sensor, such as a GNSS sensor, may be utilized to calculate the navigation solution. In alternative embodiments, the navigation solution is calculated differently based upon the phase of flight. In one, the vertical component calculation utilizes the sensing unit at or below the sensing unit's rated altitude. In another, vertical component calculation blends the sensing unit with the sensor. The blending may be based upon percentages based upon altitude or utilize filtering such as Kalman filtering. The present invention is particularly advantageous for close to ground operations, insuring perspective terrain will stay consistent with the real world.

20 Claims, 5 Drawing Sheets

METHOD OF POSITIONING PERSPECTIVE TERRAIN ON SVS PRIMARY FLIGHT DISPLAYS USING TERRAIN DATABASE AND RADIO ALTITUDE

FIELD OF THE INVENTION

The present invention relates generally to guidance instruments and more particularly to a method of positioning perspective terrain on SVS (synthetic vision systems) primary flight displays using terrain database and radio altitude.

BACKGROUND OF THE INVENTION

The greatest contributing factor to most fatal worldwide airline and general aviation crashes is limited visibility. Synthetic vision systems (SVS) have been developed to offer pilots a clear, electronic picture of what is ahead, regardless of time and weather conditions. SVS also presents data (such as terrain, obstacles, air traffic, landing and approach patterns, and other relevant information) as part of the picture in a way that allows pilots to easily synthesize and deal with all information relevant to flight (referred to as situational awareness). SVS typically include a primary flight display (PFD) which displays all information critical to flight, a multi-function display (MFD) which displays navigational and weather information, and an engine indications and crew alerting system (EICAS) display which displays information about the aircraft's systems. Synthetic vision is an advanced feature of the PFD portion of the SVS which replaces the traditional attitude indicator with a synthetic view.

Perspective terrain (derived from a terrain database), other aircraft, and the desired course are typically synthetically rendered on the PFD to mimic the outside view and simulate the current environment. Typically, a navigation solution (a calculation of position and time) is computed utilizing on-board sensors such as GNSS (Global Navigation Satellite System), barometric altimeter, ADC (Air Data Computer), and IRS (Inertial Reference System or Inertial Guidance System). The navigation solution is utilized to position the perspective terrain in the synthetic vision on the PFD. However, the computed navigation solution often does not have enough vertical accuracy, especially while the aircraft is close (less than 100 meters) to the ground. Barometric altimeters measure altitude above Mean Sea Level (MSL), which can be hundreds of meters off actual altitude. Other methods can provide altitude estimation which may be better or worse than barometric altimeters. GNSS gives very good lateral position or latitude and longitude, but is much less accurate for altitude. This inaccuracy manifests itself in inaccurate depiction of the perspective terrain. The aircraft may appear too high above or below the terrain. Regardless of the precision of the terrain database, if the navigation solution is incorrect, the perspective terrain displayed will present misleading information. Acquiring an accurate navigation solution sufficient for close to ground operations can be costly.

Consequently, it would be desirable to provide method of inexpensively and accurately positioning perspective terrain on SVS primary flight displays, especially for close to ground operations.

SUMMARY OF THE INVENTION

Accordingly, the present invention is directed to a method of positioning perspective terrain on SVS (Synthetic Vision System) primary flight displays.

The present invention displays perspective terrain on a display positioned based upon a navigation solution, the vertical component of which is calculated utilizing a terrain database and a sensing unit which provides height above terrain. The sensing unit may be, but is not limited to, a radio altimeter or a laser rangefinder. The terrain database provides the elevation of terrain above Mean Sea Level (MSL). MSL is the average (mean) height of the sea, with reference to a suitable reference surface. The present invention may also utilize a sensor such as a GNSS sensor, a barometric altitude sensor, an ADC sensor, or a IRS sensor in calculating the navigation solution.

In alternative embodiments, the vertical component of the navigation solution is calculated differently utilizing the terrain database and the sensing unit based upon the phase of flight. In one alternative embodiment, the sensing unit includes a rated altitude. The rated altitude may be the altitude to which the radio altimeter is accurate. In calculating the navigation solution, the sensing unit is utilized to calculate the vertical component of the navigation solution when the sensing unit is approximately at or below the rated altitude. In another alternative embodiment, the calculation of the vertical component of the navigation solution blends the sensing unit and sensor. The blending may be based on percentages differing based upon altitude or may utilize advanced filtering, such as Kalman filtering, to utilize both the sensing unit and sensor in some capacity at all times.

The present invention is particularly advantageous for close to ground operations, where traditional methods are inaccurate, insuring that perspective terrain will stay consistent with the real world.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to exemplary embodiments of the invention, examples of which are illustrated in the accompanying drawings.

Figure 1:
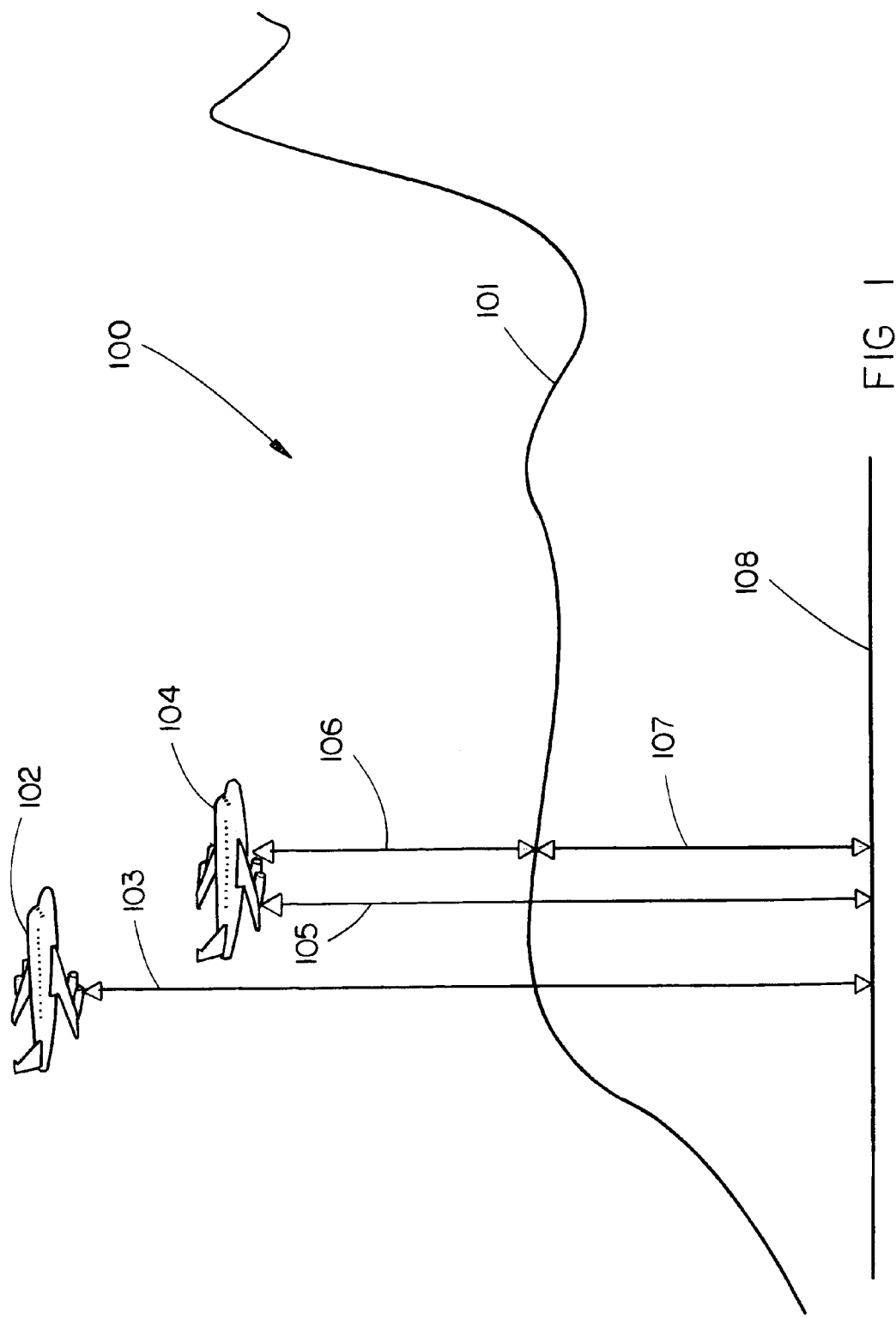
FIG. 1 is a view illustrating two representations of an aircraft in relation to terrain and mean sea level positioned based upon two navigation solutions.

Referring generally to FIG. 1; a synthetic view 100 is illustrated showing terrain 101, mean sea level (MSL) 108, and two representations of an aircraft 102 and 104. Double arrow-headed line 105 illustrates the actual altitude of the aircraft. Double arrow-headed line 103 illustrates an estimated altitude of the aircraft derived from a barometric altimeter or GNSS (Global Navigation Satellite System). Double arrow-headed line 106 illustrates the height of the aircraft above terrain 101 derived from, but not limited to, a radio altimeter or laser rangefinder. Double arrow-headed line 107 illustrates the elevation of terrain 101 above MSL 108 derived from a terrain database. Aircraft representation 102 illustrates the presentation of the relation between the aircraft and terrain when the terrain has been positioned based upon a navigation solution computed utilizing the estimated altitude 103 derived from a barometric altimeter or GNSS. Aircraft representation 104 illustrates the presentation of the relation between the aircraft and terrain when the terrain has been positioned based upon a navigation solution computed (in accordance with an exemplary embodiment of the present invention) utilizing the height above terrain, derived from, but not limited to, a radio altimeter or laser rangefinder, and the elevation of terrain above MSL, derived from a terrain database.

Figure 2:
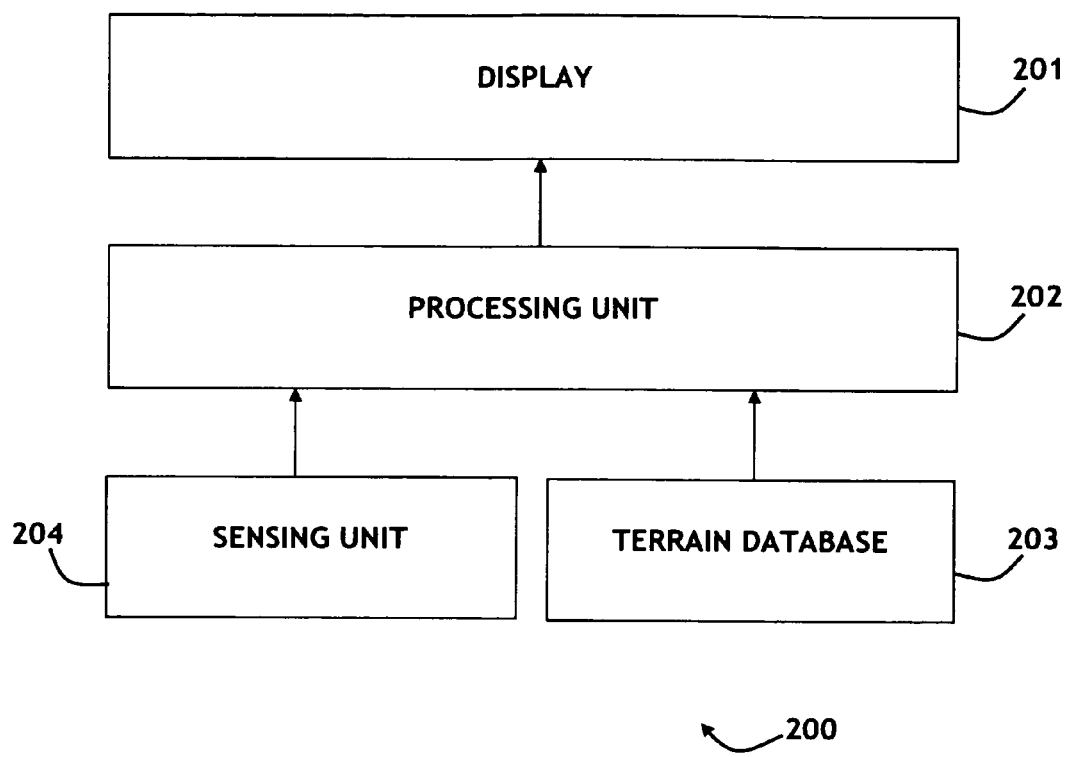
FIG. 2 is a block diagram illustrating a display assembly for a SVS (Synthetic Vision System), in accordance with an exemplary embodiment of the present invention.

Referring generally to FIG. 2; a display assembly 200 for a SVS (Synthetic Vision System), in accordance with an exemplary embodiment of the present invention, is illustrated. The display assembly 200 includes a processing unit 202 for calculating a perspective terrain and calculating a navigation solution. The display assembly 200 further includes a display 201 for displaying the perspective terrain. The processing unit 202 is coupled to the display 201. The display 201 positions the perspective terrain displayed based upon the navigation solution calculated by the processing unit 202. The navigation solution calculated by processing unit 202 includes a vertical component. The display assembly 200 further includes a terrain database 203 and a sensing unit 204. The terrain database 203 and the sensing unit 204 are coupled to the processing unit 202. The terrain database 203 provides the elevation of terrain above MSL. MSL is the average (mean) height of the sea, with reference to a suitable reference surface. The sensing unit 204 provides altitude above terrain. The sensing unit 204 may be any sensing unit which provides height above terrain, such as a radio altimeter or a laser rangefinder. The processing unit 202 utilizes the terrain database 203 and the sensing unit 204 in calculating the vertical component of the navigation solution.

The processing unit 202 is not limited to any particular processor or hardware and/or software technology and may comprise any combination of hardware and/or software capable of calculating the navigation solution without departing from the scope of the present invention.

The present invention may only position perspective terrain, runways, and/or taxiways based upon the navigation solution, the vertical component of which was calculated utilizing the sensing unit and the terrain database. The present invention may position the aircraft and other aircraft based on altitude estimation derived from a barometric altimeter or GNSS. Aircraft are frequently instructed by air traffic control to fly at a specific altitude referencing barometric altitude. If an aircraft has been instructed by air traffic control to fly at an altitude with reference to barometric altitude, flying at that altitude with reference to a more accurate altitude would violate air traffic control instructions. The present invention may position the aircraft based upon the altitude estimation derived from barometric altitude to be in compliance with the instructions from air traffic control.

The display assembly 200 may further include at least one sensor. The sensor may be a sensor of a type, including but not limited to, a GNSS sensor, a barometric altitude sensor, an ADC (Air Data Computer) sensor, or an IRS (Inertial Reference System) sensor. The sensor may be coupled to the processing unit 202. The processing unit 202 may utilize the sensor in calculating the navigation solution.

In alternative embodiments, the processing unit 202 calculates the vertical component of the navigation solution differently utilizing the terrain database and the sensing unit based upon the phase of flight.

In an alternative embodiment, the sensing unit 204 may include a rated altitude. The rated altitude may be the altitude to which the sensing unit 204 is accurate. At altitudes equal to or below the rated altitude, the sensing unit 204 may be accurate. At altitudes above the rated altitude, the sensing unit 204 may not be accurate. In calculating the navigation solution, the processing unit 202 utilizes the sensing unit 204 to calculate the vertical component of the navigation solution when the sensing unit 204 is approximately at or below the rated altitude. The rated altitude may be approximately 5000 feet. The rated altitude may be approximately 2500 feet.

In another alternative embodiment, the processing unit 202 blends the sensing unit 204 and the sensor in calculating the vertical component of the navigation solution. If the processing unit 202 abruptly switches from computing the vertical component of the navigation solution utilizing a less accurate altitude to computing the vertical component of the navigation solution utilizing the sensing unit 204, a bad visible artifact could result. The display 201 could suddenly drop or raise the terrain by a large amount. To mitigate this, at 2500 feet the processing unit may utilize the sensing unit 204 0% and the sensor 100% in calculating the vertical component of the navigation solution. At 2000 feet the processing unit may utilize the sensing unit 204 20% and the sensor 80% in calculating the vertical component of the navigation solution. At 0 feet the processing unit may utilize the sensing unit 204 100% and the sensor 0% in calculating the vertical component of the navigation solution. Alternately, the processing unit may utilize the sensing unit 204 100% and the sensor 0% in calculating the vertical component of the navigation solution between approximately 500 feet and touchdown.

In an additional alternative embodiment, the processing unit 202 blends the sensing unit 204 and the sensor in calculating the vertical component of the navigation solution. The processing unit 202 may utilize advanced filtering to utilize both the sensing unit 204 and the sensor in calculating the vertical component of the navigation solution in some capacity at all times. The advanced filtering may be Kalman filtering (an efficient recursive filter which estimates the state of a dynamic system from a series of incomplete and noisy measurements).

Figure 3:
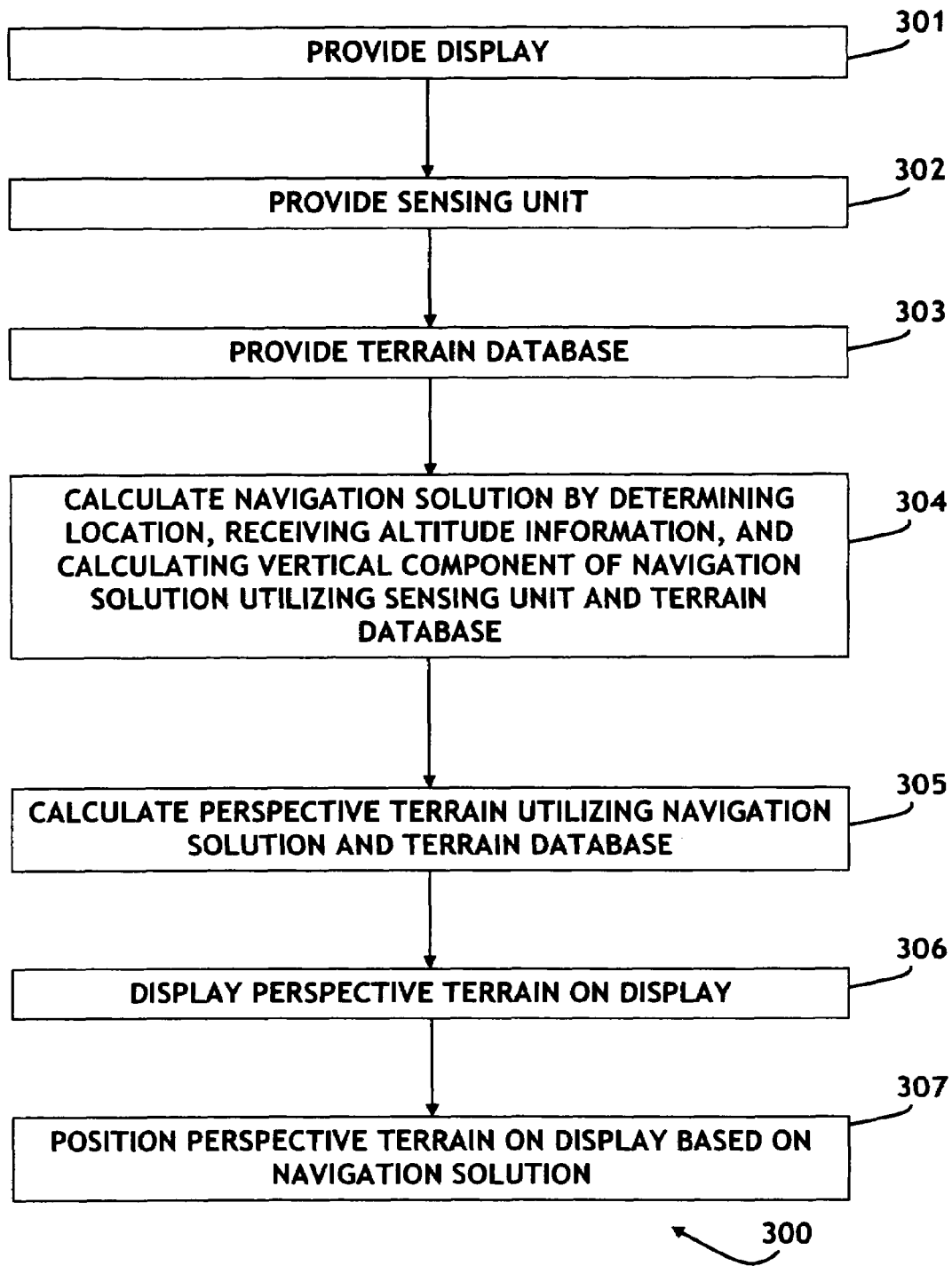
FIG. 3 is a flow chart illustrating a method of displaying perspective terrain on a display for a SVS, in accordance with an exemplary embodiment of the present invention.

Referring now to FIG. 3; a method 300 of displaying perspective terrain on a display for a SVS, in accordance with an exemplary embodiment of the present invention, is shown. In step 301, a display is provided. In step 302, a sensing unit is provided, which provides height above terrain. The sensing unit may be, but is not limited to, a radar altimeter or a laser rangefinder. In step 303, a terrain database is provided. The terrain database may provide the elevation of terrain above MSL. In step 304, the navigation solution is calculated by determining location, receiving altitude information, and calculating the vertical component of the navigation solution utilizing the terrain database and the sensing unit. In step 305, perspective terrain is calculated utilizing the navigation solution and the terrain database. In step 306, perspective terrain is displayed on the display. In step 307, the perspective terrain is positioned on the display based upon a navigation solution. The navigation solution may be calculated utilizing a GNSS (Global Navigation Satellite System) sensor, a barometric altitude sensor, an ADC (Air Data Computer) sensor, or an IRS (Inertial Reference System) sensor.

Figure 4:
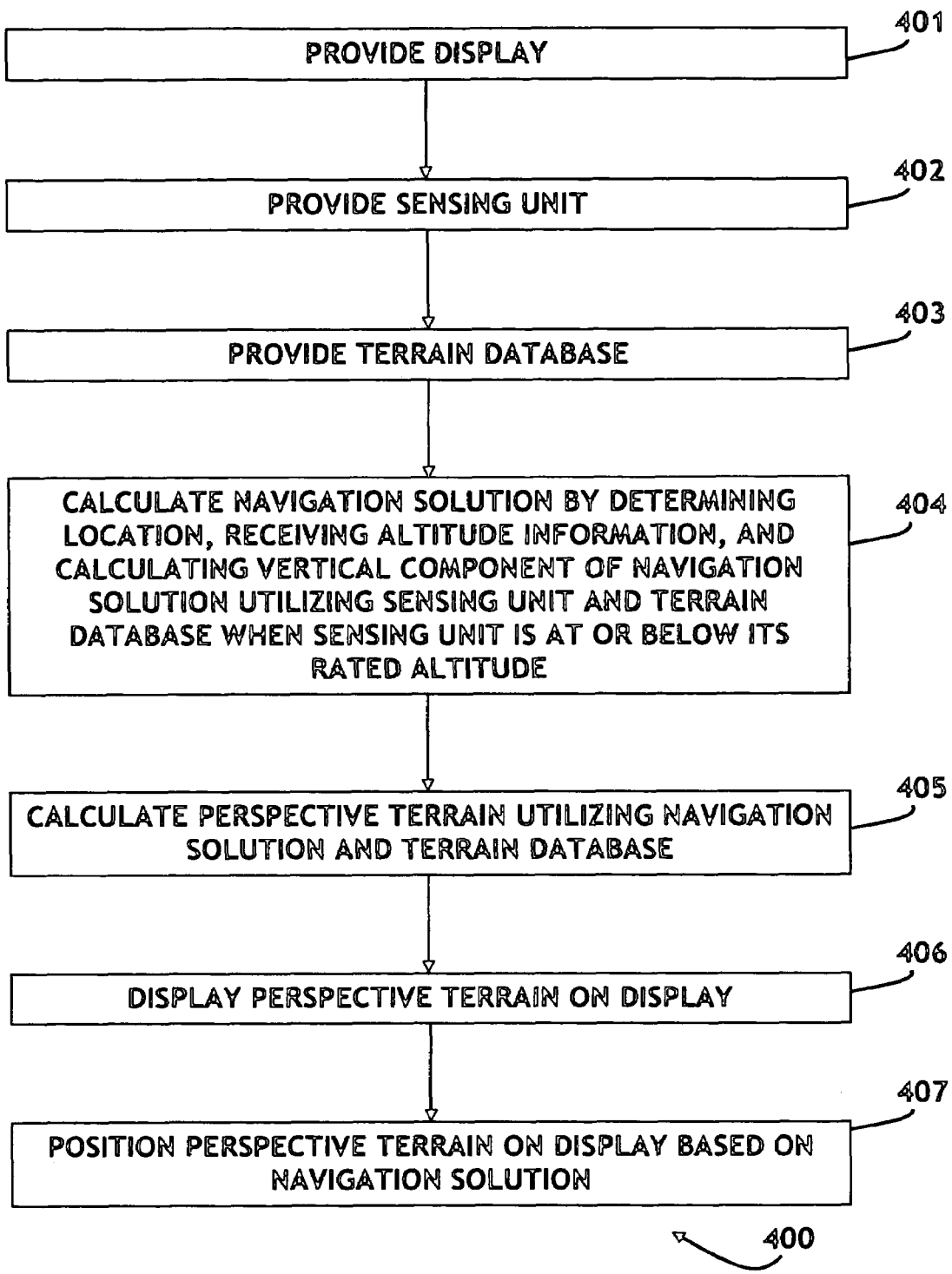
FIG. 4 is a flow chart illustrating a method of displaying perspective terrain on a display for a SVS, in accordance with an alternative embodiment of the present invention.

Referring now to FIG. 4, a method 400 of displaying perspective terrain on a display for a SVS, in accordance with an alternative embodiment of the present invention, is shown. In step 401, a display is provided. In step 402, a sensing unit is provided, which provides height above terrain. The sensing unit may be, but is not limited to, a radio altimeter or a laser rangefinder. The sensing unit includes a rated altitude. At altitudes equal to or below the rated altitude, the sensing unit may be accurate. At altitudes above the rated altitude, the sensing unit may not be accurate. The rated altitude may be approximately 5000 feet. The rated altitude may be approximately 2500 feet. In step 403, a terrain database is provided. The terrain database may provide the elevation of terrain above MSL. In step 404, the navigation solution is calculated by determining location, receiving altitude information, and calculating the vertical component of the navigation solution utilizing the terrain database and the sensing unit when the sensing unit is at or below its rated altitude. In step 405, the perspective terrain is calculated utilizing the navigation solution and the terrain database. In step 406, perspective terrain is displayed on the display. In step 407, the perspective terrain is positioned on the display based upon a navigation solution.

Figure 5:
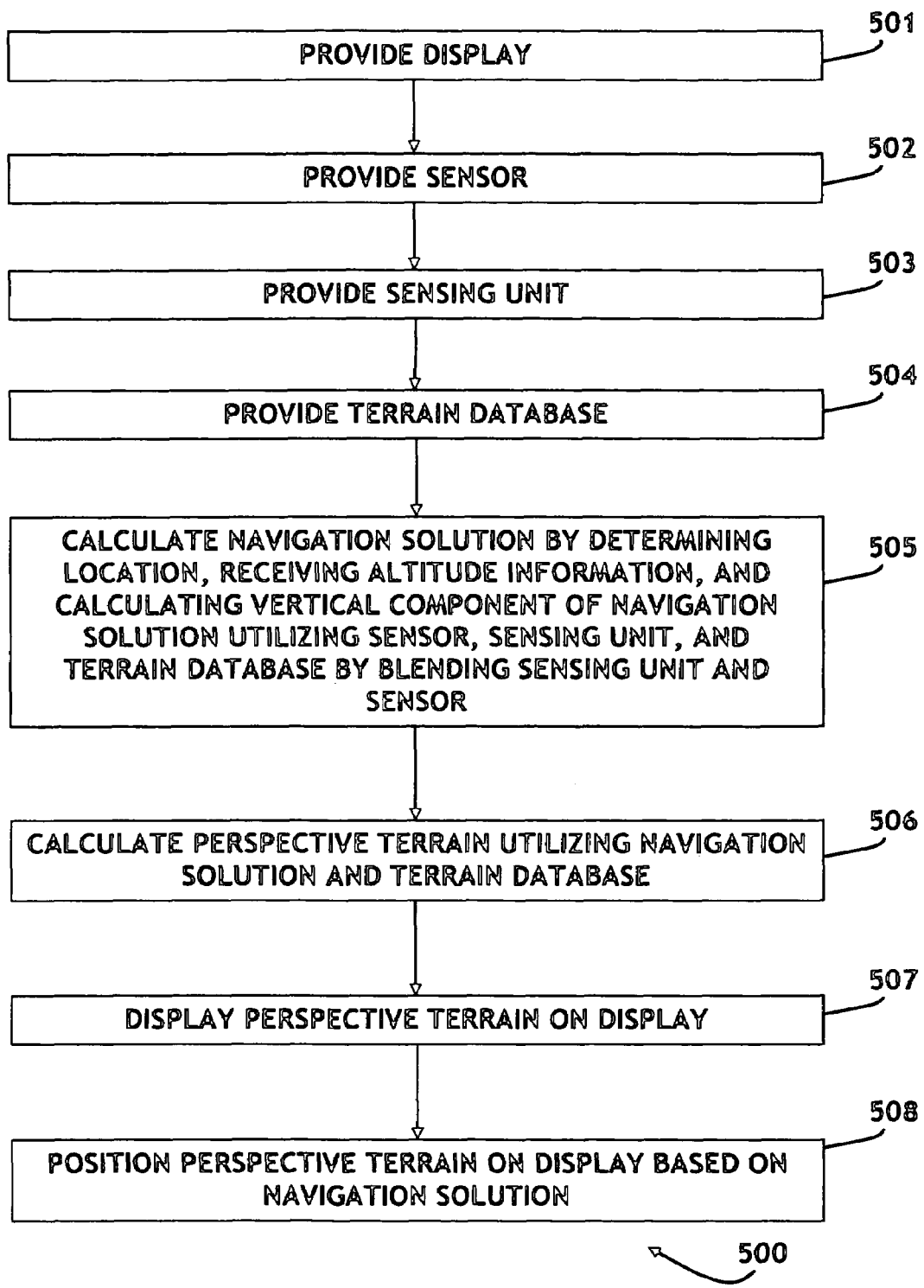
FIG. 5 is a flow chart illustrating a method of displaying perspective terrain on a display for a SVS, in accordance with an alternative embodiment of the present invention.

Referring now to FIG. 5, a method 500 of displaying perspective terrain on a display for a SVS, in accordance with an alternative embodiment of the present invention, is shown. In step 501, a display is provided. In step 502, a sensor is provided. The sensor may be a GNSS (Global Navigation Satellite System) sensor, a barometric altitude sensor, an ADC (Air Data Computer) sensor, or an IRS (Inertial Reference System) sensor. In step 503, a sensing unit is provided, which provides height above terrain. The sensing unit may be, but is not limited to, a radio altimeter or a laser rangefinder. In step 503, a terrain database is provided. The terrain database may provide the elevation of terrain above MSL. In step 504, the navigation solution is calculated by determining location, receiving altitude information, and calculating the vertical component of the navigation solution utilizing the sensor, the sensing unit, and the terrain database by blending the sensor and sensing unit. In step 505, the perspective terrain is calculated utilizing the navigation solution and the terrain database. In step 506, perspective terrain is displayed on the display. In step 507, the perspective terrain is positioned on the display based upon a navigation solution.

The blending of the sensor and sensing unit in calculating the vertical component of the navigation solution may be based upon percentages differing based upon altitude. At 2500 feet the processing unit may utilize the sensing unit 0% and the sensor 100% in calculating the vertical component of the navigation solution. At 2000 feet the processing unit may utilize the sensing unit 20% and the sensor 80% in calculating the vertical component of the navigation solution. At 0 feet the processing unit may utilize the sensing unit 100% and the sensor 0% in calculating the vertical component of the navigation solution. Alternately, the processing unit may utilize the sensing unit 100% and the sensor 0% in calculating the vertical component of the navigation solution between approximately 500 feet and touchdown.

Alternately, the blending of the sensor and sensing unit may utilize advanced filtering to utilize both the sensor and the sensing unit in calculating the vertical component of the navigation solution in some capacity at all times. The advanced filtering may be Kalman filtering.

The present invention provides a method of inexpensively and accurately positioning perspective terrain on SVS displays. The present invention is particularly advantageous for close to ground operations, where traditional methods are inaccurate. The present invention insures that perspective terrain will stay consistent with the real world.

It is understood that the present invention is not limited to any underlying implementing technology. The present invention may be implemented utilizing any combination of software and hardware technology.

The present invention may be implemented using a variety of technologies without departing from the scope and spirit of the invention or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A display assembly, comprising:
    a processing unit for calculating a perspective terrain and calculating a navigation solution, the navigation solution including a vertical component;
    a display for displaying the perspective terrain, the perspective terrain positioned on the display based upon the navigation solution;
    a sensing unit, which provides height above terrain; and
    a terrain database;
    wherein the processing unit is coupled to the display, the sensing unit is coupled to the processing unit, the terrain database is coupled to the processing unit, and the processing unit calculates the vertical component of the navigation solution utilizing at least the sensing unit and the terrain database.

2. The display assembly as claimed in claim 1, wherein the display assembly is incorporated into a SVS(Synthetic Vision System).

3. The display assembly as claimed in claim 1, wherein the sensing unit is selected from a radio altimeter and a laser rangefinder.

4. The display assembly as claimed in claim 1, wherein the display assembly further comprises at least one sensor selected from a GNSS (Global Navigation Satellite System) sensor, a barometric altitude sensor, an ADC (Air Data Computer) sensor, and an IRS (Inertial Reference System) sensor, the sensor is coupled to the processing unit, and the processing unit calculates the navigation solution utilizing the sensor.

5. The display assembly as claimed in claim 4, wherein the sensing unit includes a rated altitude and the processing unit utilizes at least the sensing unit to calculate the vertical component of the navigation solution when the sensing unit is approximately at or below the rated altitude.

6. The display assembly as claimed in claim 5, wherein the rated altitude is less than or equal to approximately twenty-five hundred feet.

7. The display assembly as claimed in claim 5, wherein the processing unit blends the sensing unit and the sensor in calculating the vertical component of the navigation solution.

8. A method of displaying perspective terrain on a display, comprising the steps of:
   providing a display;
   providing a sensing unit, which provides height above terrain;
   providing a terrain database;
   calculating a navigation solution which includes a vertical component, comprising the steps of:
      determining current geographic location;
      receiving altitude information from the sensing unit and the terrain database; and
      calculating the vertical component of the navigation solution utilizing at least the sensing unit and the terrain database;
   calculating perspective terrain utilizing navigation solution and terrain database;
   displaying a perspective terrain on the display; and
   positioning the perspective terrain on the display based upon the navigation solution.

9. The method of claim 8, wherein the display is incorporated into a SVS (Synthetic Vision System).

10. The method of claim 8, wherein the sensing unit is selected from a radio altimeter and a laser rangefinder.

11. The method of claim 8, wherein the navigation solution is calculated utilizing at least one sensor selected from a GNSS (Global Navigation Satellite System) sensor, a barometric altitude sensor, an ADC (Air Data Computer) sensor, and an IRS (Inertial Reference System) sensor.

12. The method of claim 11, wherein the sensing unit includes a rated altitude and the vertical component of the navigation solution is calculated utilizing the sensing unit when the sensing unit is approximately at or below the rated altitude.

13. The method of claim 12, wherein the rated altitude is less than or equal to approximately twenty-five hundred feet.

14. The method as claimed in claim 12, wherein sensing unit and sensor are blended in the calculation of the vertical component of the navigation solution.

15. An SVS (Synthetic Vision System), comprising:
   a sensing unit, which provides height above terrain;
   a terrain database;
   a processing unit, coupled to the sensing unit and to the terrain database, which calculates a perspective terrain and calculates a navigation solution including a vertical component utilizing at least the sensing unit and terrain database; and
   a display, coupled to the processing unit, which displays a perspective terrain positioned based upon the navigation solution.

16. The SVS as claimed in claim 15, wherein the sensing unit is selected from a radio altimeter and a laser rangefinder.

17. The SVS as claimed in claim 15, wherein the SVS further comprises at least one sensor selected from a GNSS (Global Navigation Satellite System) sensor, a barometric altitude sensor, an ADC (Air Data Computer) sensor, and an IRS (Inertial Reference System) sensor, the sensor is coupled to the processing unit, and the processing unit calculates the navigation solution utilizing the sensor.

18. The SVS as claimed in claim 17, wherein the sensing unit includes a rated altitude and the processing unit calculates the vertical component of the navigation solution utilizing the sensing unit when the sensing unit is approximately at or below the rated altitude.

19. The SVS as claimed in claim 18, wherein the rated altitude is less than or equal to approximately twenty-five hundred feet.

20. The SVS as claimed in claim 18, wherein the processing unit blends the sensing unit and the sensor in calculating the vertical component of the navigation solution.

\* \* \* \* \*